INVENTORS
Emile Plumat
José Lelong

BY Spencer & Kaye

ATTORNEYS

United States Patent Office 3,673,006
Patented June 27, 1972

3,673,006
METHOD AND APPARATUS FOR SURFACE COATING ARTICLES
Emile Plumat, Gilly, and José Lelong, Fleurus, Belgium, assignors to Glaverbel S.A., Watermael-Boitsfort, Belgium
Filed Sept. 9, 1968, Ser. No. 758,334
Claims priority, application Great Britain, June 26, 1968, 30,531/68; Luxembourg, Sept. 18, 1967, 54,489
Int. Cl. C23c *11/00, 13/00*
U.S. Cl. 117—106 R        10 Claims

ABSTRACT OF THE DISCLOSURE

Method and apparatus for applying a substance vaporizable by electron bombardment to a surface to form a coating thereon. The substance is vaporized in a vacuum by being bombarded with electrons. The vapor, thus formed, travels from where it is formed and is deflected onto such surface to coat the same.

BACKGROUND OF THE INVENTION

The present invention relates to a method and apparatus for surface coating articles with a substance vaporizable by electron bombardment and, preferably, a metal or metal compound.

The need to apply metals and metal compounds as very thin and uniform surface coatings arises in various technological fields including, inter alia, the manufacture of light-transmitting materials and articles such as lenses and windshields incorporating surface coatings to reduce light or radiant-heat reflection or to serve for electrical conductance; the decoration of metal and plastic articles; the manufacture of highly light-reflecting materials for use in mirrors, searchlights and other products; and in the electronics field for the production of printed circuitry.

In the manufacture of such products, two surface coating methods are employed in which the surface to be coated is contacted by atoms or molecules of the coating substance in a fairly high vacuum environment. In one of these methods, the so-called cathode sputtering technique is used in which the coating substance forms the cathode of a cathode-anode system and is disintegrated by bombardment with the positive ions, and in the other of them the coating substance is thermally evaporated.

Each of these known methods as hitherto practiced has its disadvantages. The cathode sputtering method tends to be injurious to certain materials if they are coated by this method. For example, if the method is used for surface coating certain transparent plastics materials, the transparency of the materials is impaired. Moreover, there are many coating materials which are incapable of being sputtered. When one turns to the thermal evaporation method as hitherto practiced, one is faced with quite severe limitations in regard to the possible physical orientations of the article to be coated in relation to the vapor source. Thus, when coating a sheet of glass, this has to be disposed substantially horizontally above the vapor source. This orientation is objectionable in the case of a large sheet because the sheet has to be supported marginally and the sheet tends to sag under its own weight. Due to this curvature of the sheet it does not become uniformly coated even if the vapor source is displaced horizontally to move it progressively under the whole surface of the sheet.

SUMMARY OF THE INVENTION

The present invention provides a coating apparatus and process which can be used for applying a wider range of substances than can be applied by the cathode sputtering method and which permits a wide choice of orientation for the article to be coated.

According to the present invention a method is provided of applying any substance vaporizable by electron bombardment and, preferably, to a surface to form a coating, wherein a quantity of the substance is vaporized in a vacuum by being bombarded by a stream of electrons, and vapor traveling from the place at which it is thus formed is deflected onto this surface.

The method may be used for coating a large sheet while the sheet is held in the vertical plane. For example, the electron stream may be directed downwardly onto a quantity of substance to be vaporized and the vapor traveling upwardly from this substance can be deflected laterally onto the sheet. If vapor is deflected in more than one lateral direction away from the vertical axis of the electron stream, the surfaces of two or more sheets can be coated simultaneously by placing such sheets at appropriate positions around such axis. As another example of the way in which the invention may be applied, the electron stream generator and the substance to be vaporized can be located within a vertical tube and the rising vapor may be deflected radially outwardly so that the inside surface of the the tube is coated. The surface or surfaces to be coated need not be vertical. Such surface or surfaces can be oriented in any way desired provided the form and dispositions of the vapor deflecting means are appropriately selected.

The invention can be employed for surface coating glass, plastic and any other material, using as the coating substance any substance capable of being vaporized by electron bombardment. By way of example, the invention can be employed for applying to a glass or other substrate, a thin uniform coating of one of the metal compounds: $Sb_2S_3$, $CdS$, $CaF_2$, $CeO_2$, $C_2O_3$, $PbCl_2$, $LiF$, $MgF_2$, $AgCl$, $NaF$, $WO_3$, $V_3O_8$ and $ZnS$. In addition a thin uniform coating of one of the metals Al, Be, Cr, Cu, Co, Au, Ni and Rh would also be suitable. Moreover, other suitable substances which are not metal or metal compounds which can be used for the coating material include C and Si.

The invention includes apparatus for performing the method hereinbefore defined. Such apparatus according to the invention comprises means, including a system of electrodes, for generating a stream of electrons for bombarding a quantity of metal or metal compounds in solid or liquid state to cause vaporization thereof, and means for deflecting vapor traveling from the place at which it is thus formed, onto the surface.

The electron stream generator may be one in which the electrons are emitted from the cathode of the electrode system used in establishing the electric field for accelerating and directing the electrons towards the quantity of metal or metal compound to be vaporized. Alternatively the electrons may be emitted from a filament. Thus the generator may be in the form of an electron beam gun.

The electron stream generator, the vapor-deflecting means and the quantity of material (which may be in the solid or liquid state) to be vaporized on the one hand, and the surface to be coated on the other hand may be relatively displaced during the period when vaporization is proceeding so as to cause successive zones along the surface to be successively coated. For example, when coating a large sheet, the latter may be disposed vertically and the electron stream generator, the vapor-deflecting means and the quantity of material to be vaporized may be displaced as a unit upwardly and/or downwardly parallel with the sheet. The electron generator, the vapor-deflecting means and a holder for substance to be evaporated can form a structural unit which can be compact and of very light weight. The electron generator uses high voltages but relatively low currents so that the electrical connections to the unit can be much lighter in weight than those required for electrical resistance heating elements used in the conventional thermal evaporation equipment.

The vapor-deflecting means can be constituted by an electrode of the electrode system used in the generation of the electron stream. It is preferable for the anode, or the main anode if more than one anode is used, of the electrode system to be disposed adjacent to or to be constituted by the quantity of material to be vaporized and for the vapor-deflecting means to be constituted by the other or another electrode of such system. The vapor-deflecting means is preferably formed by the cathode of the electrode system. This implies that the anode is not disposed between the cathode and the substance being evaporated, and the electrons of the stream are accelerated by the electric field over the whole of the distance from the cathode to the substance. Moreover, a portion of the heat radiated by the material being evaporated is radiated onto the cathode, thus increasing its emissivity and permitting the electrical power to be reduced.

The electrode system may comprise an anode which forms a holder, e.g., a crucible, for the material to be evaporated. That expedient contributes to keeping the number of constituent elements of the generator to a minimum. The inside of the holder may be lined with refractory material and may be heat-insulated on the outside.

For small capacity installations, it may be preferred for the electron stream generator to be independent of any holder for the material to be evaporated so that one holder can be readily removed and replaced by another without affecting the generator itself in any way. As an example, the generator may be a form of an electron beam gun. When the generator is independent of any holder for the material to be vaporized, any electrode of the electrode system can constitute the vapor-deflecting means, but preferably this means is constituted by the anode or the main anode of the system.

The efficiency of the generator can be improved by heating the cathode. For this purpose a heating element or elements may be located adjacent the cathode, preferably between the cathode and a thermal screen.

DESCRIPTION OF THE PREFERRED EMBODIMENTS

Figure 1:
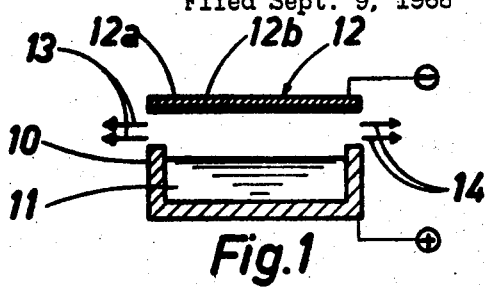
FIG. 1 is a cross-sectional view of a preferred form of the apparatus according to the invention.

In the embodiment according to FIG. 1, a crucible 10 contains the substance or material 11 to be evaporated and deposited on the surface of an article (not shown).

The form and dimensions of the crucible may be selected to suit the particular nature and characteristics of the articles to be coated. In the case of sheets of glass, for instance, the crucible may be in the form of an elongated trough having a transverse cross-sectional shape as shown in FIG. 1, and a length somewhat greater than the width of the sheets to be treated. The crucible 10 is made of a material which is a good conductor of electricity, such as copper, tungsten or molybdenum, the material being chosen with due regard to the nature of the material which is to be evaporated and the working temperature, because the material to be evaporated should not react with the material of the crucible. The material 11 to be evaporated may be an electrically conductive or a non-conductive material.

The crucible 10 forms the anode of the electrode system for establishing the electron stream. The cathode is disposed above the crucible and extends over the whole length and width thereof. The cathode is formed, for instance, by a tungsten plate 12a coated with thorium oxide 12b, to increase its emissivity. The cathode 12 can be heated by the circulation of an alternating electric current in the tungsten plate 12a. The apparatus, when in use, is located in an evacuated chamber. A potential difference is maintained between the crucible 10 forming the anode and the cathode 12 sufficient to cause evaporation of the material 11 in the crucible as a result of the bombardment thereof by the electrons emitted by the cathode 12. The vapors, which rise vertically from the surface of the material 11, are deflected laterally by the cathode 12. The spacing of the cathode from the crucible is chosen so that the deflected vapor is concentrated in fairly well defined horizontal streams as indicated by the arrows 13, 14 for coating sheets located in vertical planes quite close to the opposite sides of the crucible.

The cathode 12 is heated not only by Joule effect, but also by thermal radiation from the material 11 in the crucible.

Two large sheets of glass can be uniformly coated by the apparatus shown in FIG. 1 by disposing the two sheets in vertical planes as aforesaid on opposite sides of the apparatus, within an evacuated enclosure and displacing the apparatus shown in the figure vertically between the sheets at a constant speed while vaporization proceeds. The apparatus may be initially located below the level of the bottom edges of the sheets and be moved upwardly or the apparatus may be moved downwardly from a level above the sheets. The apparatus may be moved over its vertical path more than once if a greater coating thickness is required. The sheets, being disposed in vertical planes, will not be deformed in any way.

In an actual coating process using apparatus as shown in FIG. 1, as just described, two sheets of glass were coated with a layer of ZnS. The thickness of the layer deposited on each sheet was 80 millimicrons so as to form a glazing which reflects heat radiation. The ZnS was held in a molybdenum crucible. The coating apparatus was displaced relative to the glass sheets at a speed of approximately 1 cm./sec. The potential between the electrode 10 and 12 was of the order of 1,500 volts. The coating was performed under a pressure of about $10^{-5}$ mm. Hg.

Figure 2:
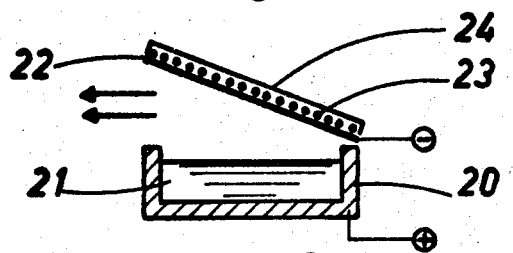
FIG. 2 is a cross-sectional view of another form of the apparatus according to the invention.

The apparatus shown in FIG. 2 is arranged for coating only one sheet at a time. The apparatus comprises a crucible 20 made of an electrically conductive material and containing the material 21 to be evaporated. Disposed above the crucible is the cathode 22, which is so inclined that the vapors emitted traveling vertically from the material 21 are deflected in only one direction as indicated by the arrows.

To increase the emissivity of the cathode 22, it is heated by an electrical resistance heating element 23 located between the top of the cathode and a heat-reflecting screen 24 of molybdenum or tantalum. The cathode may be heated in some way alternative to this, e.g., by bombarding the cathode with electrons from a secondary electron source.

When using apparatus as shown in FIGS. 1 and 2 the material to be evaporated can be changed quickly, since it is enough to replace the crucible containing the material which has been used for depositing a first type of layer by another crucible containing the fresh material to be deposited.

Figure 3:
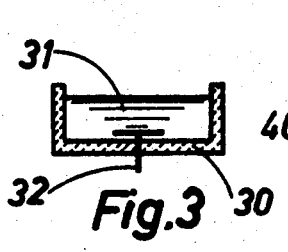
FIG. 3 is a cross-sectional view of one form of the crucible according to the invention.

The crucible shown in FIG. 3 can be used when the material to be deposited 31 is formed by an electrically conductive material. In that case the crucible 30 is made of a refractory material. The electrical contact with the material 31 is provided by means of an electrode 32 extending through the bottom of the crucible 30 so that in fact the material 31 forms an electrode, or electrode extension.

Figure 4:
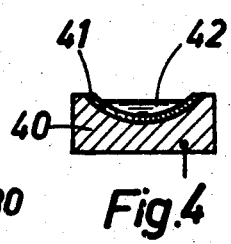
FIG. 4 is a cross-sectional view of another form of the crucible according to the invention.

If it is required to use a crucible made of electrically conductive material, e.g., copper, and the material to be evaporated reacts with such conductive material at elevated temperature, a layer of a refractory material which is not attacked by the material to be evaporated can be interposed between the body of the crucible and its contents, as shown in FIG. 4. FIG. 4 shows a copper crucible 40, and an alumina layer 41 interposed between the crucible 40 and a quantity of aluminum 42 to be evaporated.

Figure 5:
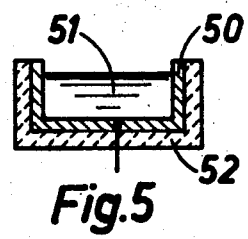
FIG. 5 is a cross-sectional view of yet another form of the crucible according to the invention.

In all cases the crucible can be provided with a heat insulating refractory outer layer to reduce heat losses. This is illustrated by FIG. 5, in which the crucible 50 containing the material 51 to be evaporated is provided with a heat-insulating refractory cladding 52.

Figure 6:
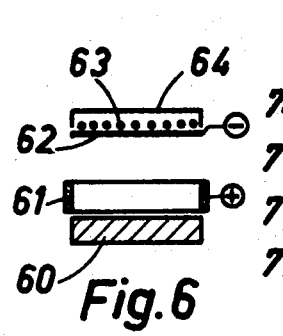
FIG. 6 is a cross-sectional view of a form of the apparatus according to the invention in which the electron stream generator is independent of the substance to be evaporated and the crucible which contains such substance.
Figure 7:
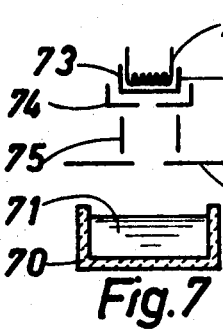
FIG. 7 is a cross-sectional view of another form of the apparatus, according to the invention, in which the electron stream generator is, as in FIG. 6, independent of the substance to be evaporated and the crucible which contains such substance.
Figure 8:
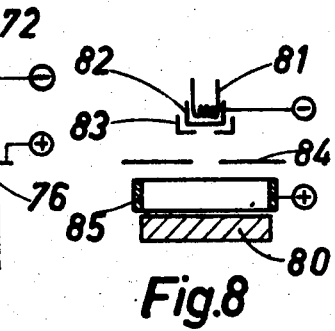
FIG. 8 is a cross-sectional view of yet another form of the apparatus, according to the invention, in which the electron stream generator is, as in FIGS. 6 and 7, independent of the substance to be evaporated and the crucible which contains such substance.

FIGS. 6 to 8 show apparatus in which the electron steam generator is indenpendent of the material to be evaporated and the crucible which contains it. This arrangement is very suitable for low output apparatus used, for instance, for test purposes in the laboratory.

In the apparatus shown by FIG. 6, the material to be deposited is in the form of a solid block 60. The anode is formed by a frame 61 slightly larger than the block 60 and located just above it. The deflector for the vapors rising from the block 60 is formed by a cathode 62 which is disposed above both the anode 61 and the block 60. The cathode 62 is heated by a radiant heating element 63 enclosed by a heat-reflecting screen 64.

In the apparatus shown by FIG. 7, material 71 to be evaporated and contained in a crucible 70 is bombarded by electrons from an electron beam gun. The electron beam gun comprises a cathode 73 which is indirectly heated by a filament 72 constituting the source of electrons, a focussing anode 74 and accelerating anodes 75, 76. The main anode 76 acts as the deflector for the vapors from the material 71.

In the apparatus shown by FIG. 8, the deflector for the vapors rising from the material 80 to be evaporated is formed by the focussing electrode 84 of an electron beam gun. The latter comprises a cathode 82 heated by a filament 81, a Wehnelt grid 83 and a main anode 85, which is disposed adjacent the material to be evaporated as in the embodiment illustrated in FIG. 6.

According to the present invention a method is provided of applying any substance vaporizable by electron bombardment and, preferably, a metal or metal compound, to a surface to form a coating, wherein a quantity of the substance is vaporized in a vacuum by being bombarded by a stream of electrons, and vapor traveling from the place at which it is thus formed is deflected onto this surface.

The invention can be employed for surface coating glass, plastic and any other material, using as the coating substance any substance capable of being vaporized by electron bombardment. By way of example, the invention can be employed for applying to a glass or other substrate, a thin uniform coating of one of the metal compounds: $Sb_2S_3$, CdS, $CaF_2$, $CeO_2$, $Cr_2O_3$, $PbCl_2$, LiF, $MgF_2$, AgCl, NaF, $WO_3$, $V_3O_8$, and ZnS. Among the different metals which may be deposited as thin film upon a transparent sheet, one can cite Al, Be, Cr, Cu, Co, Au, Ni and Rh. Other suitable substances which are not metal or metal compound and which can be used for coating supports with thin films are Si and C.

It will be understood that the above description of the present invention is susceptible to various modifications, changes and adaptations.

What is claimed is:

1. Method of applying a substance which is vaporizable by electron bombardment to a surface to form a coating thereon, comprising the steps of
    (a) vaporizing a quantity of said substance in a vacuum by bombardment with a stream of electrons from an electrode system of a generator provided for such purpose; and
    (b) mechanically deflecting, by a heated electrode of said electrode system, the vapor thus formed from where said substance is electron bombarded onto said surface.

2. Method according to claim 1 wherein said substance is a metal.

3. Method according to claim 1 wherein said substance is a metal compound.

4. A method according to claim 1 wherein the electron stream is directed downwardly onto the material to be vaporized and said vapor is deflected laterally with respect to such stream onto said surface.

5. Method according to claim 4 wherein said surface is one of a plurality of surfaces which are simultaneously coated by deflection of said vapor laterally with respect to such stream onto such surfaces.

6. Method according to claim 5 wherein each surface which is coated is the surface of a sheet held in a substantially vertical plane.

7. Method according to claim 6, comprising the further step of relatively displacing the electron stream generator, the heated electrode and the substance to be vaporized on the one hand, and the surface being coated on the other hand, during the vaporization so that successive surface portions are successively coated.

8. Method according to claim 7 wherein the substance vaporized is selected from the group of metal compounds consisting of: $Sb_2S_3$, CdS, $CaF_2$, $CeO_2$, $Cr_2O_3$, $PbCl_2$, LiF, $MgF_2$, AgCl, NaF, $WO_3$, $V_3O_8$, ZnS.

9. Method according to claim 7 wherein the substance vaporized is in the liquid state.

10. Method according to claim 7 wherein the substance vaporized is in the solid state.

References Cited
UNITED STATES PATENTS

| | | | |
|---|---|---|---|
| 2,942,098 | 6/1960 | Smith, Jr. | 219—121 EBM |
| 2,100,045 | 11/1937 | Alexander | 204—298 |
| 3,267,015 | 8/1966 | Morley | 204—298 |

JOHN H. MACK, Primary Examiner

N. A. KAPLAN, Assistant Examiner

U.S. Cl. X.R.

117—107, 107.1; 156—2; 204—192